April 6, 1926.
V. CANDELARESI
MOTOR CAR BODY
Filed Jan. 14, 1924     3 Sheets-Sheet 1
1,579,644
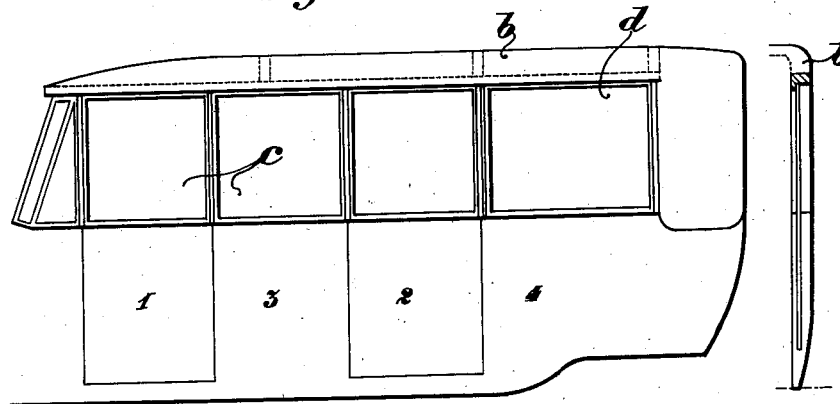
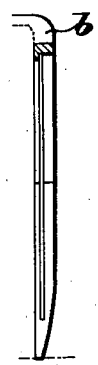
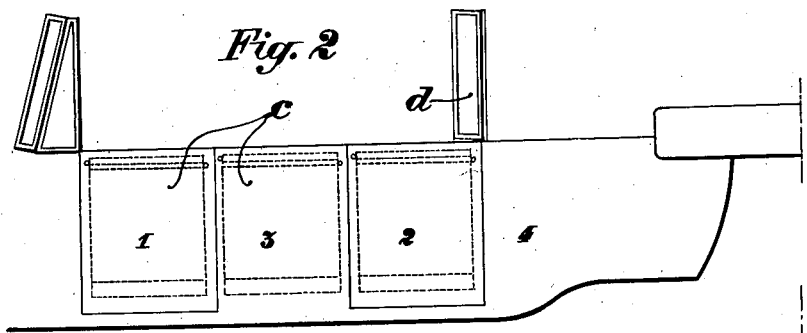
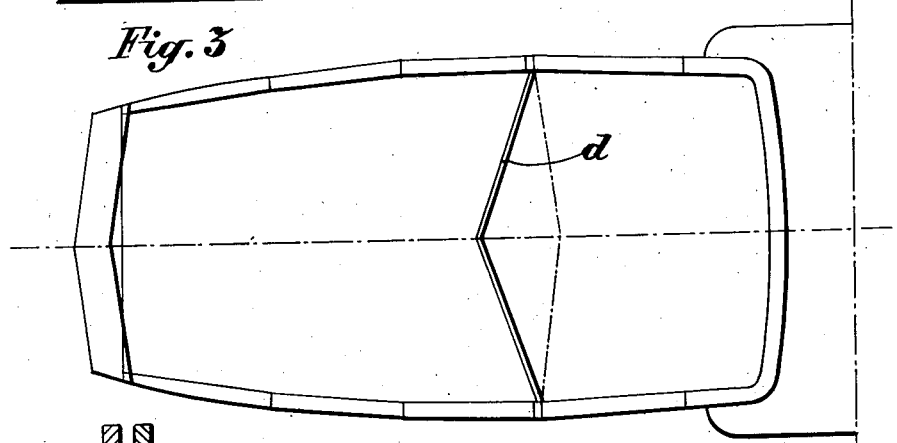
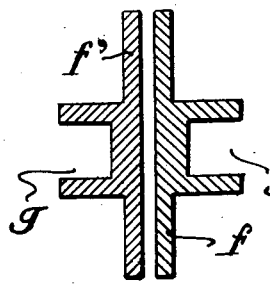
Inventor:
Virgilio Candelaresi
By
Attorney April 6, 1926. 1,579,644
V. CANDELARESI
MOTOR CAR BODY
Filed Jan. 14, 1924  3 Sheets-Sheet 2

Inventor:
Virgilio Candelaresi
By
Attorney

April 6, 1926. 1,579,644
V. CANDELARESI
MOTOR CAR BODY
Filed Jan. 14, 1924   3 Sheets-Sheet 3
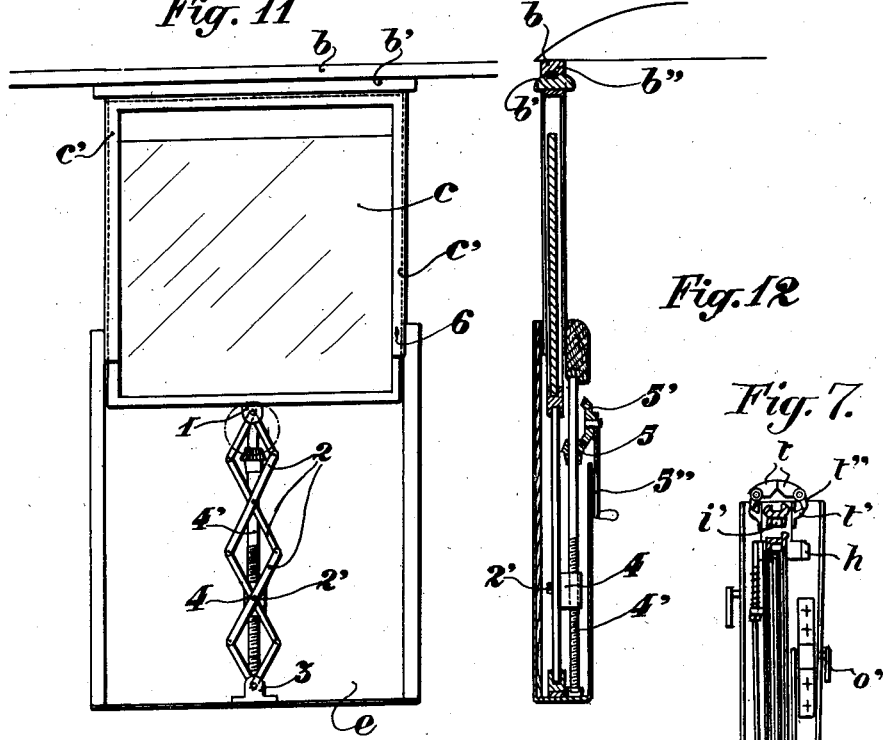
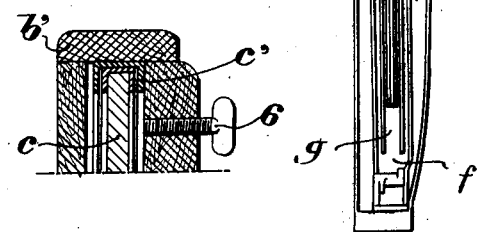
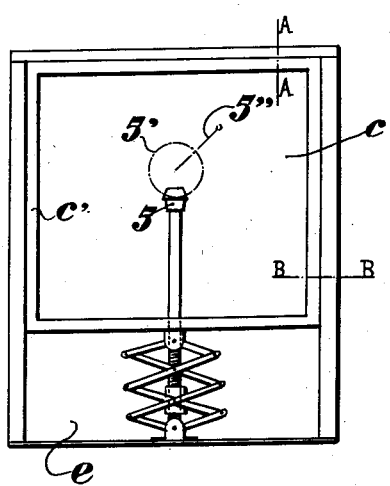
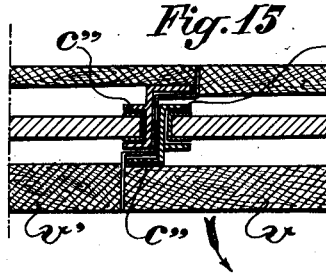
Inventor:
Virgilio Candelaresi Patented Apr. 6, 1926.

1,579,644

UNITED STATES PATENT OFFICE.

VIRGILIO CANDELARESI, OF LYON, FRANCE.

MOTOR-CAR BODY.

Application filed January 14, 1924. Serial No. 686,192.

*To all whom it may concern:*

Be it known that I, VIRGILIO CANDE-LARESI, a subject of the King of Italy, residing at Lyon, France, have invented certain new and useful Improvements in Motor-Car Bodies, of which the following is a specification.

This invention relates to improvements in motor car bodies and consists in an improved construction of body of the "all weather" type.

The particular features of construction consists in articulation and locking means in the open and closed position of the two guide-supports or uprights for the windows of the car; means for obstructing the receptacle of each panel after lowering the window therein; means for actuating the up and down movement of the windows and means for controlling the door-handles.

The annexed drawing illustrates an example of the invention in which:—

Fig. 1 is an outer view in elevation of the car body arranged as a closed conveyance.

Fig. 2 shows the same arranged as an open car.

Fig. 3 is a plan view of Fig. 2.

Fig. 4 is a side view in section of one of the sides of the closed body.

Fig. 7 is a section of the door adapted for the open car.

Fig. 10 is a section on line C—C of Fig. 5, of the vertical irons limiting the receptacles of the sash-windows inside the panels.

Figs. 11 to 15 illustrate means for raising and lowering the windows and modified methods of mounting the windows; of these figures:—

Fig. 11 is a view in front elevation of a carriage frame of which the window has been partially raised by the control device.

Fig. 12 is a vertical section of Fig. 11.

Fig. 13 is an outer front view of a panel frame into which the window has been lowered.

Fig. 14 is a detail section on a larger scale on line A—A of Fig. 13, showing the upper part of the frame of which the sash has been lowered.

Fig. 15 is a detail section on a larger scale on line B—B of Fig. 13 illustrating the method of assembling two panels of which one is movable.

The carriage body of usual form illustrated by Figs. 1, 2 and 3, is provided with a roof $b$ of any ordinary known type capable of being extended as shown in Fig. 1 or of being folded up as shown in Figs. 2 and 3.

The two doors 1 and 2 placed on each side of the carriage body and the panel 3 which separates these doors, are provided with vertically movable windows $c$. The back panels 4 of the carriage body may be provided with a pivotal window $d$ which can be turned towards the centre of the carriage to constitute a wind-screen (Figs. 2 and 3) or it may be a sash window similar to windows $c$.

Each sash-window $c$ is housed in a recess $e$ provided in the thickness of a panel of the carriage wall the panel being bounded on its sides by two vertical irons $f$, $f^1$ shown in section in Fig. 10. Each of these irons has on the inside a groove $g$ in which the frame of the sash-window $c$ can slide. At the top of each of the irons $f$ $f^1$ are arranged two projections $h$ between which are articulated uprights $i$ $i^1$ shown in section in Figs. 8 and 9. The two uprights $i$ $i^1$ have inner grooves $j$ for guiding the sash-window $c$ and the outer surface of the upright $i$ is provided with a second groove $j^1$ into which fits the upright $i''$ of the adjacent panel. The two uprights $i^1$ situated on the side of the closing of the door are each provided with a flange $k$ forming a double abutment.

Each upright $i$, $i^1$ is limited at its lower end by a stop $l$ bearing on the carriage frame when the upright is raised to its vertical position. One of the connecting hooks of the uprights $i$, $i^1$ is extended by an abutment $l^1$ on which is articulated a rod $m$ provided with a spring $m^1$ and the end of which is engaged in a hole $n^1$ of a projection $n$ belonging to the iron $f$ or $f^1$.

At the top of each panel are articulated two tongue-pieces $t$ mounted on hinges $t^1$ and provided with abutment pieces $t''$.

The devices for opening the doors comprises a lever $o$ actuated by means of the outer handle $o^1$ of the car and pivoted to a support $p$ secured vertically against one of the uprights of the frame of the door. This lever $o$ carries a rod $q$ connected at the other end to one of the ends of a horizontal balance lever $r$ articulated in a bracket piece $r^1$. To the other end of the lever $r$ is attached a second rod $q^1$ the upper end of which is secured to a working lever $s$ of the door lock $s^1$.

When the car is arranged as an open conveyance (Fig. 2) all the windows are lowered into the panels of the carriage body. Above the window-sashes $c$ are placed horizontally the jointed uprights $i^1$, $i^1$ and the upper end of the recess $e$ of each panel is obstructed by the tongue pieces $t$ which are turned down one against the other (Fig. 7).

To open the doors, the lever $o$, balance lever $r$ and rod-gear $q$, $q^1$ allow of actuating the lever $s$ of the lock $s^1$ on the other side of the window-sash $c$.

Figure 6:
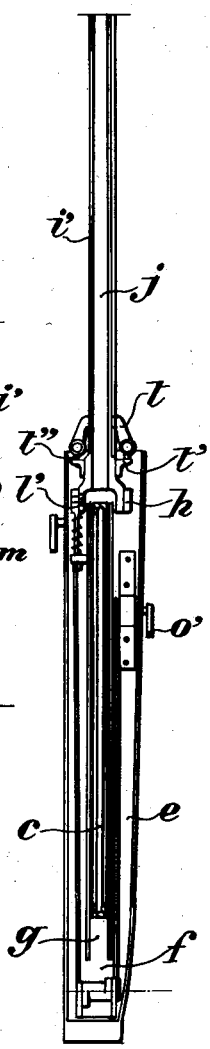
Fig. 6 is a section of the door in the position shown in Fig. 5.

In order to transform the car into a closed conveyance by junction of the sash-windows with the roof which has previously been extended, the two tongue-pieces $t$ are separated and the two uprights $i$, $i^1$ are successively raised into the position shown in Fig. 6. These uprights are kept vertical owing to the pressure on the abutments $l^1$ of the springs $m^1$ mounted on the rods $m$, the ends of which are extended through holes $n^1$ of the projection $n$ of the irons $f$, $f^1$.

Figure 8:
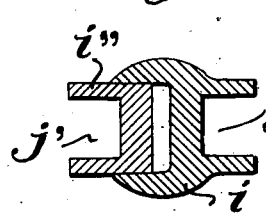
Fig. 8 is a section on line A—A of Fig. 5 drawn to a larger scale.
Figure 9:
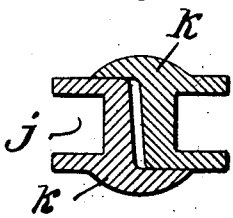
Fig. 9 is a section on line B—B of Fig. 5.

As shown in Figs. 8 and 9, the two adjacent uprights $i$, $i''$ fit into one another while the upright $i^1$ situated at the swinging side of the door is provided at its outer side with a flange $k$ which enables it to rest on the adjacent upright, which is also provided with a similar flange $k$ intended to form a watertight closure for the door.

The upper ends of the uprights $i$, $i^1$, $i''$ by resting against the framework of the roofing $b$ in suitable shaped recesses are held in a most rigid manner and their grooves $j$ allow of raising the windows $c$ by the control devices hereinafter described. The two tongue pieces $t$, the separation of which affords a passage for the windows $c$ form junctions between the panels and the raised windows.

Referring to Figs. 11 to 15.

In the recess $e$ provided in a panel of usual form a frame $c^1$ slides vertically. The inner faces of this frame are provided with channels to allow the displacement of the window $c$ which can slide in said channels.

At the upper part of the frame $c^1$ is secured a horizontal moulding $b^1$ which can abut against the cant-rail $b''$ of the hood (Fig. 2) when the frame $c^1$ is raised, or cover the opening of the recess $e$ of the carriage panel when the frame is lowered.

At the centre of the lower side of the sash window $c$ is arranged a bracket piece 1 connected by means of a series of jointed connecting rods 2 to a lower bracket piece 3 fastened on the bottom of the recess $e$ of the panel.

One of the connecting pivots $2^1$ of two connecting rods 2 is made integral with a nut 4 in which is screwed a screw threaded rod $4^1$ which carries a cone pinion 5 actuated by a bevelled gear wheel $5^1$ by means of a crank $5''$.

In the thickness of the panel and opposite one of the sides of the frame $c^1$ is a locking screw 6 the tip of which exerts pressure against the said frame $c^1$.

In order to allow the assembling of a door panel $v$ with a fixed panel $v^1$ (Fig. 15) the irons of the frames $c^1$ are provided on one side with an outer rim $c''$ which overlaps the adjacent frame $c^1$.

When the frame $c^1$ of the window $c$ is lowered, the moulding $b^1$ overlaps the panel of the carriage and completely hides the inner recess $e$ (Figs. 13–14). In order to raise the frame $c$ it suffices to actuate the crank $5''$ which controls the rotation of the screw $4^1$ in the nut 4 of which the ascending displacement is multiplied by the three articulations of the connecting rods 2. When the moulding $b^1$ encounters the hood $b$ it exerts pressure on a joint $b''$ and a tight closure is formed.

The frame $c^1$ of the sash window $c$ is thus completely secured and cannot drop under the effect of vibrations.

Figure 5:
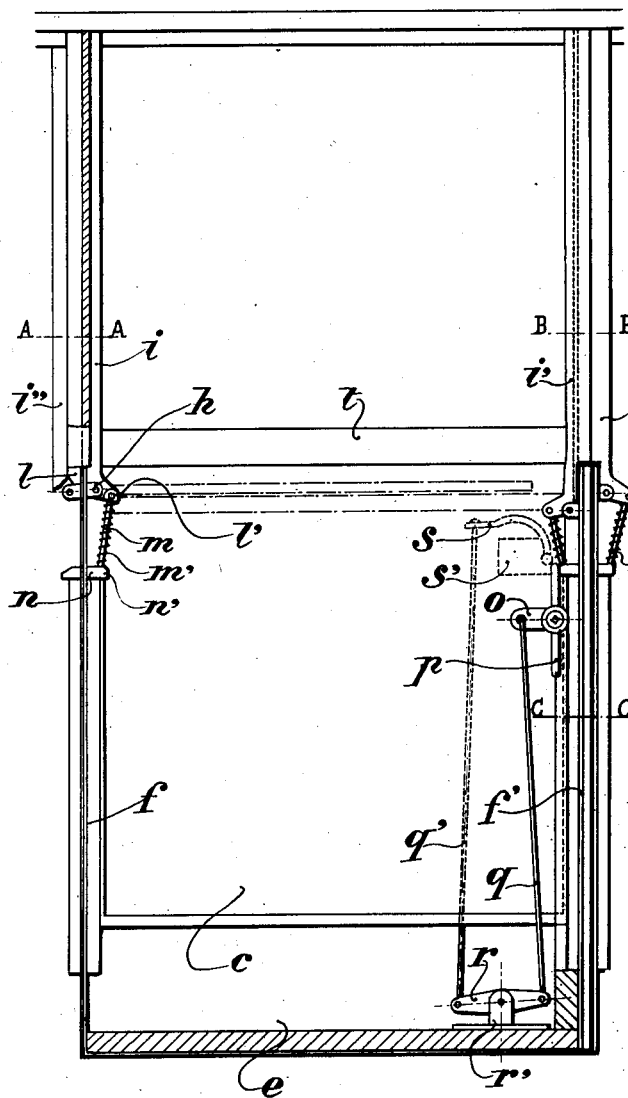
Fig. 5 is a detail front view of a door of which the uprights are raised to receive the window-sash.

The water-tightness of each raised frame $c^1$ belonging to a door panel is secured by the rims $c''$ which overlap the upright of the adjacent frame $c^1$ (Fig. 5).

To ensure the fixity of each raised frame $c^1$ in its respective panel it suffices to lock the screw 6 which exerts pressure on the said frame and prevent its vibration. Moreover this locking of the frame $c^1$ has the effect of keeping it raised and of allowing the window sash alone to descend under the control of the handle $5''$ (Fig. 1). The vehicle can thus be transformed into a closed carriage of which all the windows can be more or less opened at will, remaining immovable in the position to which they have been brought by the mechanical control.

What I claim as my invention and desire to secure by Letters Patent of the United States is:—

In a motor car body having hollow fixed side panels and hollow door panels, sash windows normally lying in said hollow panels, vertical side irons in said panels having grooves in which said sash windows can slide, uprights hinged to said vertical side irons, said uprights being grooved on each side, flanges on said uprights, spring governed means for maintaining said uprights in vertical extension of said side irons, tongue pieces extending along the top edges of said hollow side panels and hinged thereto and means for raising or lowering said sash-windows.

In witness whereof I have signed this specification.

VIRGILIO CANDELARESI.